United States Patent
Norman

(10) Patent No.: US 10,768,612 B2
(45) Date of Patent: Sep. 8, 2020

(54) METHOD FOR BACK END PLANNING AND SCHEDULING

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/971,709

(22) Filed: May 4, 2018

(65) Prior Publication Data

US 2018/0348743 A1    Dec. 6, 2018

Related U.S. Application Data

(60) Provisional application No. 62/514,543, filed on Jun. 2, 2017.

(51) Int. Cl.
    *G05B 19/418*    (2006.01)

(52) U.S. Cl.
    CPC .. *G05B 19/41865* (2013.01); *G05B 19/41885* (2013.01); *G05B 2219/32343* (2013.01); *G05B 2219/34418* (2013.01)

(58) Field of Classification Search
    CPC ........ G05B 19/41865; G05B 19/41885; G05B 2219/32343; G05B 2219/34418
    See application file for complete search history.

(56) References Cited

U.S. PATENT DOCUMENTS

| | | | | |
|---|---|---|---|---|
| 6,205,439 B1* | 3/2001 | Gardner | ................ | G05B 17/02 706/7 |
| 6,278,901 B1* | 8/2001 | Winner | ................ | G06Q 10/06 700/99 |
| 6,321,133 B1* | 11/2001 | Smirnov | ................ | G06Q 10/06 700/100 |
| 6,546,364 B1* | 4/2003 | Smirnov | ................ | G06Q 10/06 703/22 |
| 7,702,411 B2* | 4/2010 | Bagchi | ............ | G05B 19/41865 700/100 |
| 7,904,192 B2* | 3/2011 | Chua | ....................... | G06Q 10/06 700/100 |
| 7,933,793 B2* | 4/2011 | Jordan | ................... | G06Q 10/04 705/7.13 |
| 10,146,214 B2* | 12/2018 | Linton | ...................... | G06N 5/02 |
| 2004/0128176 A1* | 7/2004 | Jordan | ................... | G06Q 10/04 705/7.22 |
| 2005/0154625 A1* | 7/2005 | Chua | ....................... | G06Q 10/06 700/100 |
| 2006/0184264 A1* | 8/2006 | Willis | ................ | G05B 19/4184 700/108 |
| 2008/0300705 A1* | 12/2008 | Bagchi | ............ | G05B 19/41865 700/100 |

(Continued)

*Primary Examiner* — Charles R Kasenge
(74) *Attorney, Agent, or Firm* — Patterson + Sheridan, LLP

(57) ABSTRACT

Embodiments presented herein provide techniques for planning and scheduling in a factory. The technique begins by generating a bottleneck loading plan from a plurality of inputs. A simulation is run using the bottleneck loading plan. The factory is simulated using decisions made based on the bottleneck loading plan and a lot-to-machine schedule is generated with the simulation bottleneck loading plan.

14 Claims, 3 Drawing Sheets

(56) References Cited

U.S. PATENT DOCUMENTS

| | | | | |
|---|---|---|---|---|
| 2009/0144692 A1* | 6/2009 | Cain | ............................ | G03F 1/68 |
| | | | | 716/50 |
| 2010/0287020 A1* | 11/2010 | Jordan | ..................... | G06Q 10/04 |
| | | | | 705/7.25 |
| 2010/0287021 A1* | 11/2010 | Jordan | ..................... | G06Q 10/04 |
| | | | | 705/7.25 |
| 2013/0117164 A1* | 5/2013 | Hong | ................. | G06Q 10/06315 |
| | | | | 705/28 |
| 2014/0249884 A1* | 9/2014 | Hong | ................... | G06Q 10/087 |
| | | | | 705/7.25 |
| 2015/0066592 A1* | 3/2015 | Ehm | ........................ | G06Q 50/01 |
| | | | | 705/7.31 |
| 2016/0103713 A1 | 4/2016 | Norman | | |

* cited by examiner

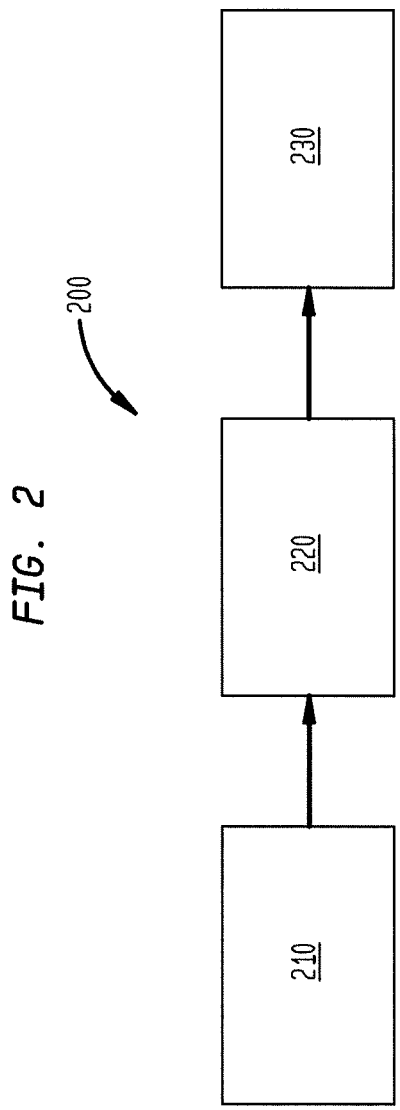

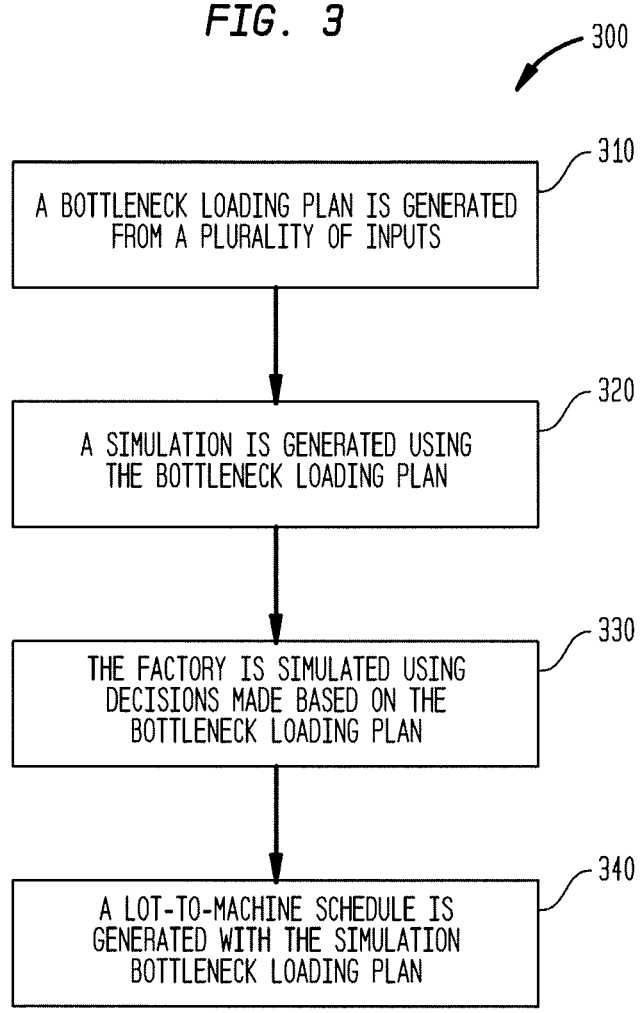

METHOD FOR BACK END PLANNING AND SCHEDULING

CROSS-REFERENCE TO RELATED APPLICATIONS

This application claims benefit of U.S. Provisional Application Ser. No. 62/514,543, filed Jun. 2, 2017, of which is incorporated by reference in its entirety.

BACKGROUND

Field

Embodiments of the present disclosure generally relate to planning, and more particularly to techniques for managing production processes within a manufacturing environment.

Description of the Related Art

Manufacturing facilities across many different industries are responsible for producing products that are used in every facet of life. In the case of semiconductor manufacturing, for example, semiconductor manufacturing facilities manufacture products such as, microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many more. In recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. Because manufacturing is so capital intensive, even small increases in factory performance (e.g., such as building to demand, shortening order to delivery time, etc.) can have large effects on financial performance (e.g., by reducing cost through leaner manufacturing, freeing up capital tied to idle inventory, etc.). For this reason, many manufacturing facilities have implemented planning systems in their facilities to ensure the complex plan for products are providing for on-time deliveries.

In the past semiconductor back-end factories, where products are assembled and tested, have been simple enough that they could be efficiently run without significant effort. Typically planning could be done using simple Excel spreadsheets and schedules generated manually, if they are created at all. However this is changing rapidly. The back-end processes are becoming more complex, e.g., reentrant flows are now common, so that the simple processes that worked in the past are not capable of effectively running the factory. At the same time, advances in supply chain optimization are requiring that the factories have much stronger requirements to meet externally imposed due dates. So current processes are both not capable of efficiently running the factory, nor are they capable of meeting the new, stringent supply chain requirements.

There is a need for an improved method for planning and scheduling a factory back end.

SUMMARY

Embodiments presented herein provide techniques for planning and scheduling in a factory. The technique begins by generating a bottleneck loading plan from a plurality of inputs. A simulation is run using the bottleneck loading plan. The factory is simulated using decisions made based on the bottleneck loading plan and a lot-to-machine schedule is generated with the simulation bottleneck loading plan.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a block diagram illustrating the scheduling system.

FIG. 3 is a flow diagram illustrating a method for planning and scheduling a factory back end.

Figure 1:
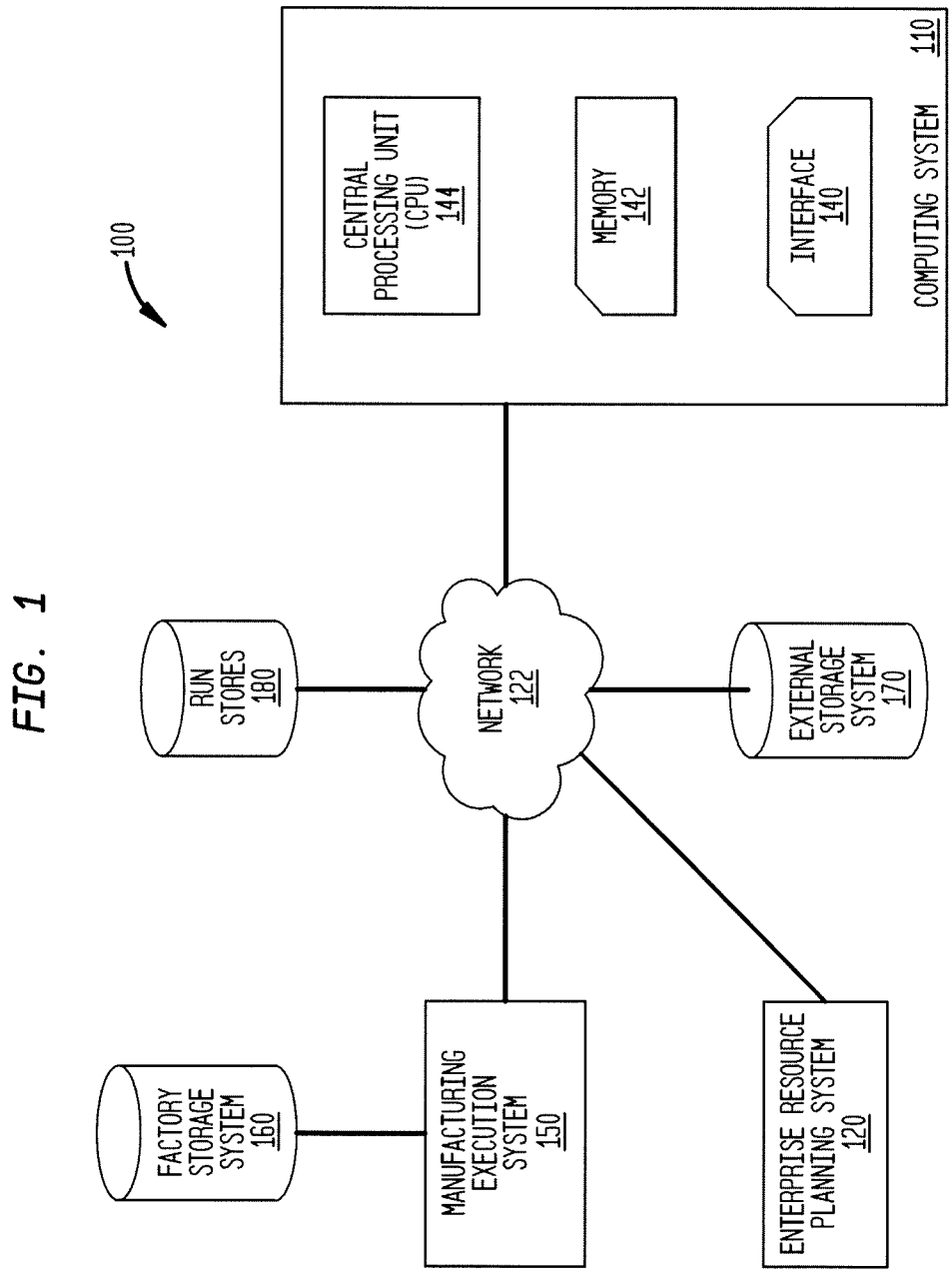
FIG. 1 illustrates a block diagram of one architecture for a manufacturing environment configured with a scheduling system, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present techniques for generating a plan to manage all or part of a manufacturing production process. A scheduling system is provided to plan and schedule a semiconductor back-end factory. The front-end is the part of the manufacturing where the work is done on the wafer level, whereas in back end the work is done at chip and module levels. The front end and back end factories can be on the same or on different locations. Although embodiments of the invention generally relate to the back end factory, it should be appreciated by one skilled in the art that the scheduling system disclosed here is may be utilized for managing the front end factory as well. Note that, for the sake of convenience, terminology related the manufacture of semiconductor devices is used in much of the following description as a reference example of the manufacturing production process that can be planned/scheduled using the techniques presented herein. Similarly, many of the following embodiments use back-end semiconductor manufacturing facilities as reference examples of types of manufacturing environments in which the techniques presented herein can be used to provide and implement the scheduling system.

The scheduling system consists of a planning module (PM), a scheduling module (SM) and a Dispatching System (DS) all connected by a block-based workflow engine. The PM takes as input the demands on the factory, factory performance data, such as units per hour, machine capacity, target machine utilization, etc. . . . and creates a mathematical programming model, using for example linear programming (LP) or mixed integer programming (MIP). The model is run to generate a solution, i.e., a plan, which produces an optimized plan for each of the factory's bottleneck machine families. The plan includes what should be processed on each one of the machines in the one, two or more families of bottleneck machines. This plan specifies which products the bottleneck family (machines) should process each day. The PM may be run two or three times each week with the plan for each run stored for running analytics or usage. The input data for the PM is managed using the block-based work flow engine and a reporting engine. The SM (Scheduling Module) takes as input the current state of the factory (current machine setup, current work in progress (WIP), etc.) and uses it to build a simulation model. The simulation model is then run to create a schedule for the factory. The simulation uses the plan from the PM. The decisions in the simulation are configured using the same block-based reporting engine, which allows the end-user to easily do customizations, e.g., decide whether to do extra setup changes if the plan can't be met because of unexpected tool downtime. The DS (Dispatch System) for the existing fab uses the schedule from the SM to determine lot-to-machine assignments and the sequence that lots should process.

FIG. 1 is a block diagram illustrating one architecture of a manufacturing environment (or system) 100, in which aspects of the present disclosure may be practiced. In one embodiment, the manufacturing environment 100 is an example of a semiconductor front-end or back-end manufacturing facility. As shown, the manufacturing environment 100 includes a computing system 110, manufacturing execution system (MES) 150, enterprise resource planning (ERP) system 120, factory storage system 160, external storage system 170, and run stores 180 connected via a network 122. In general, the network 122 can be a wide area network (WAN), local area network (LAN), wireless LAN (WLAN), etc. The factory storage system 160, external storage system 170 and run stores 180, in general, can be any kind of storage system, including, for example, relational and/or hierarchal databases, distributed filing systems, network attached storage (NAS), storage-area network (SAN), etc. In one embodiment, the computing system 110, MES 150 and ERP system 120 can be any kind of physical computing system having a network interface, such as a desktop computer, laptop computer, mobile device, tablet computer, server computing systems, gateway computers, and the like.

The computing system 110 may include memory 142, central processing unit (CPU) 144, and user interface 140. The memory 142 may have data and applications stored therein. For example, the memory 142 may store planning data for use by a user. The memory 142 may also store applications such as a planning application configured to implement one or more of the operations for running on the CPU 144. The planning application may generate plans for the manufacturing environment 100. For example, in the case of semiconductor manufacturing, a user can generate plans for determining if capacity of the manufacturing system can satisfy demands, what changes (if any) the manufacturing system should implement to meet demands, project future output of the manufacturing system, determine which products the manufacturing system produces, where the products will be produced, the amount of products to produce, run experiments to determine what operations the manufacturing system should perform, etc.

The MES 150 and ERP system 120 are generally configured to manage and control the operation of a current work-in-progress (WIP) within the manufacturing environment 100. However, it should be appreciated that other systems may be configured to manage sources of data and operations in the manufacturing environment. The plans generated on the computing system 110 may be loaded into memory, manufacturing equipment, the ERP system 120, or other suitable locations for organizing the demands in the plan for fulfilment by the MES 150. For a front-end semiconductor manufacturing factory, the MES 150 can control one or more processes related to the fabrication of semiconductor substrates. For a back-end semiconductor manufacturing factory, the MES 150 can control one or more processes related to cutting, assembly, and testing of semiconductor die on the substrates. The MES 150 can monitor the operation of one or more tools (or equipment) operating in the manufacturing environment 100, receive data directly from the tools, receive data from the ERP system 120, analyze data from the tools and ERP system 120, and/or collect the data. In one embodiment, the MES 150 can store the data (received from the tools) into factory storage system 160. Such information stored in the factory storage system 160 can include information regarding the current WIP, number of tools in the manufacturing environment, operating parameters (e.g., processing speeds, capacity load, and the like) of the tools, manufacturing data, and other metadata characteristic of the manufacturing environment 100.

The ERP system 120 is configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 160, ERP system 120, or other suitable storage device. The collective information regarding a quantity of parts associated with a commitment to a customer is represented by a single demand. The collective demands are organized to form the plan.

The ERP system 120 may be configured to contain information for planning and scheduling a factory back end. The planning and scheduling utilize information provided by external and internal systems to plan and schedule for factory utilization ensuring timely fulfillment of various customer demands. Alternately, the scheduling system may be contained in an external system or other suitable location. The demands are planned and scheduled based on commitments for fulfillment and machine utilization among other parameters. The ERP system 120 may utilize a scheduling system (item 200 in FIG. 2) to simulate and schedule factory production.

FIG. 2 is a block diagram illustrating a scheduling system 200. The scheduling system 200 has a planning module (PM) 210, a scheduling module (SM) 220 and a Dispatching System (DS) 230. The PM 210, SM 220 and DS 230 may all be connected by a block-based (drag and drop) workflow engine. A workflow consists of an orchestrated pattern of business activity enabled by the systematic organization of resources into processes that transform materials, provide services, or process information. The workflow depicts the sequence of steps needed to create the plan, create the schedule, and publish the schedule to the dispatching system. This includes gathering data from ERP system 120, MES 150, etc., and transforming it to the format needed by the system, creating the optimization model, solving it, processing the result into a plan, creating the simulation model, using the plan in the simulation model, running the simulation model, processing its results into a schedule, and publishing the schedule to the dispatching system. The timing of various events, e.g., creating a new plan or schedule, is also included in the workflow. Generically, the PM 210, SM 220 and DS 230 may be connected by any suitable workflow engine.

The planning module 210 optimizes the factory plan. The planning module 210 take in as input demands (customer orders), material availability, equipment capacity, equipment output (UPH) and a host of other parameters. The planning module 210 may develop a plan for optimizing equipment utilization and/or optimizing on-time delivery. The planning module 210 may additionally prioritize demands in determining the equipment loading plan. The planning module 210 develops a bottleneck loading plan for one, two, or three bottleneck equipment families. The bottleneck loading plan may look at units processed daily, shiftly, half-daily, or in other buckets of time and develop a schema for utilization of each piece of equipment. The PM 210 does not determine which families are bottlenecks, it just decides, given a list of bottlenecks, what those bottlenecks should work on. The planning module 210 may run at a frequency as conditions change in the factory. For example, equipment goes off line, orders are being fulfilled or unfulfilled or the plan has become stale due to age. The planning module 210 may output a bottleneck plan and a setup change plan to the scheduling module 220.

The scheduling module (SM) 220 follows the bottleneck plan. The SM 220 takes in as input the bottleneck loading plan from the PM 210, material availability, machine availability, current machine set-up with lot completion time, current schedule of work in progress (WIP), equipment qualification/dedication, along with other parameters.

The scheduling module (SM) 220 takes the input and outputs detailed lot-to-machine schedules with Start/Finish times. Alternately or concurrently, the SM 220 generates detail schedule simulations. These simulations may or may not ever be run in the manufacturing environment and may be used to refine the lot-to-machine schedules. The lot-to-machine schedules meet the bottleneck loading plan to feed demands/product through the bottlenecks in the factory. This allows the schedule to meet lot priorities by maximizing equipment utilization. For example, the lot-to-machine schedules simultaneously place demands around the bottleneck equipment are not holding other demands up, i.e., there are no or fewer demands waiting at the bottleneck equipment for availability upon completion of other demands. The simulation is configured using a block-based environment providing easy operations and improved readability. This allows the end user to control exactly how the plan is used in the simulation: when the setups occur, how upstream equipment families feed the bottleneck families, etc. Thus, efficient equipment utilization may be achieved.

The SM 220 may run and rerun the simulations at frequencies that ensure changes in the process environment, such as machine down time or demands exceed predicted times or finishing early, may be advantageously exploited. For example, the SM 220 may run hourly to refresh the schedule and provide near real-time notification of manufacturing output. Alternately, the SM 220 may run each shift to provide metrics of user and machine output that may be used to refine operations or procedures. In yet other scenarios, the SM 220 may be run as needed based on unexpected factory events. The overall performance of the manufacturing system increases by using trial runs or simulations with the equipment bottlenecks, feed lots, machine setup etc., to arrive at a best scenario for throughput.

The SM 220 validates the lot-to-machine schedule to ensure that the simulation can actually process the plan. The SM 220 post-processes the simulation results to ensure the simulation matches the factory. In one embodiment, the SM 220 compares historical factory performance to previous simulation runs, processing speeds, yield, etc. In another embodiment, the DS 230 provides real-time data to the SM for validating the lot-to-machine schedule.

The dispatching system (DS) 230 attempts to follow detailed lot-to-machine schedules provide by the SM 220. The dispatching system (DS) 230 handles exceptions such as unexpected equipment shutdown or other manufacturing interruptions such as the unavailability of raw material required in the operations. The DS 230 may provide and/or analyze real-time feedback with regard to maintaining the detailed lot-to-machine schedule. In one example, the DS 230 may sample real-time factory data, compare the factory data with the detailed lot-to-machine schedules and provide ad hoc adjustments to the detailed lot-to-machine schedules. The block-based workflow may be configured to receive events from the factory, e.g., a machine going down. When an event is received the workflow may gather factory data and based on that data regenerate or adjust the schedule. All these operations may be performed in the workflow and is configurable by the end user. The schedule may be automatically regenerated or re-optimized based on deviations from the existing schedule by a certain amount or threshold. The deviations may be based on per line, per tool, or deviations across the entire fabrication environment. Incremental schedule correction, near term reordering/break-ins, detecting temporary bandwidth may additionally be performed by the DS 230. Alternately, the DS 230 may sample real-time factory data, compare the factory data with the detailed lot-to-machine schedules and provide notification to the SM 220. For example, the DS 230 may provide a notification to the SM 220 upon a variance in the detailed lot-to-machine schedules exceeding a threshold. The SM 220 provides an updated detailed lot-to-machine schedule to the DS 230 upon receipt of the notification.

The dispatching system (DS) 230 takes in as input the lot-to-machine schedules and the real-time factory data. The dispatching system (DS) 230 attempts to meet the lot-to-machine schedules and handle any exceptions or interruptions in the lot-to-machine schedules. Thus, the DS 230 is able to provide the next lot for each machine while increasing the overall throughput performance of the factory. Whenever a machine finishes a lot, the DS 230 decides what the machine should work on next based on the lot-to-machine schedule for that machine. The DS 230 decides when lots should be split while following the schedule along with handling any exceptions, machine downtime, lots placed on hold, etc. The dispatching system 230 is also configured using the block-based system, so the operator may elect to split the lots to maximize throughput.

An example product flow may include: wafer sawing, die attaching, wire bonding, molding and testing. The lot-to-machine schedules provide an optimized factory plan by looking at one or two bottleneck machine families and not the entire factory. The factory plan only applies to the bottleneck families while the lot-to-machine schedule applies to most or all of the machines in the factory. The factory plan is based on time buckets, such as one day, one shift, half day, etc. For example, the SM 220 runs a simulation of the entire factory (or most of the factory). The simulation makes decisions to fulfil/generate the lot-to-machine schedules. For example, the simulation may run regressive iterations to arrive at the lot-to-machine schedules. The SM 220 follows the bottleneck plan from the PM 210 at the each of the bottleneck machine families. The SM 220 may deviate from the bottleneck plan. The block-based workflow configures how the plan is used allowing the SM 220 to be user-configurable. The SM 220 makes sure the bottleneck family of machines area fed correctly first. At families of machines post bottleneck, the SM 220 may use a simple first in first out rule (FIFO), and may follow the earliest due date, highest priority, etc. The output of the simulation is the lot-to-machine schedule for DS 230 to follow. The lot-to-machine schedule provides which lots should be processed on each machine along with start and end times. In some scenarios, the lots may be split across several machines to increase throughput, decrease in cycle time, and minimize the bottlenecks.

FIG. 3 is a flow diagram illustrating a method for planning and scheduling a factory back end. In a first block 310, a bottleneck loading plan is generated from a plurality of inputs. The bottleneck loading plan provides the underlying problem machines for implementing an optimized factory plan. The bottleneck loading plan takes into account the lots, i.e., demands, work orders, etc., raw material and factory state among other parameter to generate the factory plan. The bottleneck loading plan provides for the bottlenecks and loading at individual machines in the factory. In one embodiment, the bottleneck loading plan is generated for only those machines that most contribute to the bottlenecks on the factory line. For example, the bottleneck loading plan depicts how many units each bottleneck machine should process of each (part, step) in each time bucket. Wherein a time bucket may be hours, shifts, days, week or other suitable units of time. In other embodiments, the bottleneck loading plan has loading for each machine in the factory. Thus, a determination is made for the individual factory equipment for which the next lot has to wait for a current lot to finish prior to using the individual factory equipment.

In a second block 320, a simulation model is generated using the bottleneck loading plan. The simulation model may include all or most machines in the production environment based on the bottleneck plan. Thus, the selected machines for the simulation model include the bottleneck machines.

In a third block 330, the factory is simulated using decisions made based on the bottleneck loading plan. The simulation is run for the entire factory and for the lots (work) processed therethrough. The decisions in the simulation are made based on the bottleneck loading plan to determine the greatest throughput therethrough the bottleneck machines during production, reduce setups, on-time delivery, increase overall throughput, decrease cycle time, etc. The simulation may be iterative to arrive, or hone in on, at a most favorable solution. Thus, each simulation may or may not be run in the production environment.

In a fourth block 340, the simulation is used to generate a lot-to-machine schedule. Upon a suitable result, the simulation is saved as a schedule for lots to individual machines. Each schedule may have multiple machines with each indicating a start and end time for the lots process through each one. The schedule is published to the factory. The schedule is dispatched to be run on the factory floor. The schedule decides what each machine should work on next based on the schedule. Real-time monitoring of the schedule is preformed to determine deviations and from the schedule. Deviations exceeding a threshold may result in a notification and adjustment of the schedule. For example, a determination that a lot is behind schedule and will not be completed by a required date may result in a new schedule of additional resources to ensure timely completion of the lot. Likewise, a determination that production is ahead of schedule may provide feedback of the availability of resources that free up other bottlenecked machines. The notification may result in the generation of a new bottleneck loading plan from the real-time data and the running a new simulation using the new bottleneck loading plan. A new schedule is developed and published to the factory.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantageously, the method described herein creates a lot to machine plan and schedule for a semiconductor manufacturing environment. The schedule ensures maximum throughput, reduce setups, on-time delivery, increase overall throughput, decrease cycle time, etc. for each lot by addressing factory bottlenecks at machines. The lot assignment are scheduled to the machine, or split to multiple machines, based on priority, available resources and other manufacturing constraints. The schedule may be simulated to determine future workflows and to optimize the schedule. The scheduled is monitored real-time to effect changes therein as deviations appear in the schedule which allow for further optimization. Furthermore, the real-time monitoring of the schedule in selected time buckets allow for further optimization by reviewing high yield and low yield buckets for process improvements.

While the foregoing is directed to embodiments of the present disclosure, other and further embodiments of the disclosure may be devised without departing from the basic scope thereof, and the scope thereof is determined by the claims that follow.

What is claimed is:

1. A method for back end planning and scheduling a factory, the method comprising:
    generating a bottleneck loading plan for one or more families of equipment from a plurality of inputs;
    generating a simulation of the factory using the bottleneck loading plan;
    creating a model for the factory by running the simulation of the factory and using decisions based on the bottleneck loading plan and a block based workflow; and
    generating a lot-to-machine schedule with the model to control one of,
        one or more processes related to fabrication of semiconductor substrates; and
        one or more processes related to cutting, assembly, and testing of a semiconductor die on semiconductor substrates;
    publishing the lot-to-machine schedule to the factory;
    implementing what each equipment should work on next based on the generated lot-to-machine schedule;
    monitoring real-time factory data of the implemented schedule;
    comparing the real time factory data of the implemented schedule to the generated lot-to-machine schedule to determine a deviation; and
    providing a notification if the deviation exceeds a threshold.

2. The method of claim 1 wherein the inputs are demands, raw materials, and a factory state.

3. The method of claim 1 wherein lot-to-machine schedules are based on time buckets, wherein the time buckets include one of one day, one shift, and a half day.

4. The method of claim 1 wherein the bottleneck loading plan comprises:
    determining individual factory equipment for which the next lot has to wait for a current lot to complete prior to using the individual factory equipment.

5. The method of claim 1 further comprising:
    generating a new bottleneck loading plan from real-time data;
    running a simulation using the new bottleneck loading plan; and
    publishing a new schedule to the factory.

6. A non-transitory computer-readable medium containing computer program code that, when executed by a processor, performs an operation for back end planning and scheduling a factory, the operation comprising:
    generating a bottleneck loading plan from a plurality of inputs;
    running a simulation using the bottleneck loading plan;

simulating the factory using decisions made based on the bottleneck loading plan; and generating a lot-to-machine schedule with the model to control one of,
  one or more processes related to fabrication of semiconductor substrates; and
  one or more processes related to cutting, assembly, and testing of a semiconductor die on semiconductor substrates;
publishing the lot-to-machine schedule to the factory;
implementing what each equipment should work on next based on the generated lot-to-machine schedule;
monitoring real-time factory data of the implemented schedule;
comparing the real time factory data of the implemented schedule to the generated lot-to-machine schedule to determine a deviation; and
providing a notification if the deviation exceeds a threshold.

7. The non-transitory computer-readable medium of claim 6 wherein the inputs are demands, raw materials, and a factory state.

8. The non-transitory computer-readable medium of claim 6 wherein lot-to-machine schedules are based on time buckets, wherein the time buckets include one of one day, one shift, and a half day.

9. The non-transitory computer-readable medium of claim 6 wherein the bottleneck loading plan comprises:
  determining individual factory equipment for which the next lot has to wait for a current lot to complete prior to using the individual factory equipment.

10. The non-transitory computer-readable medium of claim 6 further comprising:
  generating a new bottleneck loading plan from real-time data;
  running a simulation using the new bottleneck loading plan; and
  publishing a new schedule to the factory.

11. A planning and scheduling system for a factory, wherein the factory comprises a plurality of work orders and one or more tools for processing the work orders, the scheduling system comprising:
  at least one processor; and
  a memory containing a program that, when executed by the at least one processor, performs an operation for planning and scheduling the factory, the operation comprising:
generating a bottleneck loading plan from a plurality of inputs;
running a simulation using the bottleneck loading plan;
simulating the factory using decisions made based on the bottleneck loading plan;
creating a model for the factory by running the simulation of the factory and using decisions based on the bottleneck loading plan and a block based workflow; and
generating a lot-to-machine schedule with the model to control one of,
  one or more processes related to fabrication of semiconductor substrates; and
  one or more processes related to cutting, assembly, and testing of a semiconductor die on semiconductor substrates;
publishing the lot-to-machine schedule to the factory;
implementing what each equipment should work on next based on the generated lot-to-machine schedule;
monitoring real-time factory data of the implemented schedule;
comparing the real time factory data of the implemented schedule to the generated lot-to-machine schedule to determine a deviation; and
providing a notification if the deviation exceeds a threshold.

12. The system of claim 11 wherein lot-to-machine schedules are based on time buckets, wherein the time buckets include one of one day, one shift, and a half day.

13. The system of claim 11 wherein the bottleneck loading plan comprises:
  determining individual factory equipment for which the next lot has to wait for a current lot to complete prior to using the individual factory equipment.

14. The system of claim 11 further comprising:
  generating a new bottleneck loading plan from real-time data;
  running a simulation using the new bottleneck loading plan; and
  publishing a new schedule to the factory.

* * * * *